United States Patent
DeLuca

(10) Patent No.: US 8,326,370 B2
(45) Date of Patent: Dec. 4, 2012

(54) SYSTEM AND METHOD FOR ROTATING A USER INTERFACE FOR A MOBILE DEVICE

(75) Inventor: Michael Joseph DeLuca, Boca Raton, FL (US)

(73) Assignee: Research In Motion Limited, Waterloo (CA)

( * ) Notice: Subject to any disclaimer, the term of this patent is extended or adjusted under 35 U.S.C. 154(b) by 132 days.

(21) Appl. No.: 12/888,915

(22) Filed: Sep. 23, 2010

(65) Prior Publication Data

US 2012/0077480 A1   Mar. 29, 2012

(51) Int. Cl.
*H04W 88/02* (2009.01)

(52) U.S. Cl. .................... 455/569.1; 455/575.1

(58) Field of Classification Search ........... 455/569.1, 455/575.1, 418; 379/443; 381/334
See application file for complete search history.

(56) References Cited

U.S. PATENT DOCUMENTS

| | | | |
|---|---|---|---|
| 7,123,734 B2 * | 10/2006 | Voth et al. | 381/334 |
| 7,925,307 B2 * | 4/2011 | Horowitz et al. | 455/569.1 |
| 2003/0157969 A1 | 8/2003 | Kim | |
| 2004/0203995 A1 | 10/2004 | Platonov | |
| 2008/0130867 A1 * | 6/2008 | Bowen | 379/443 |
| 2008/0146289 A1 | 6/2008 | Korneluk et al. | |
| 2008/0182632 A1 * | 7/2008 | Jung | 455/575.1 |
| 2009/0209281 A1 | 8/2009 | Suzuki et al. | |
| 2009/0316882 A1 | 12/2009 | De Haan | |
| 2010/0008523 A1 | 1/2010 | Demuynck et al. | |

FOREIGN PATENT DOCUMENTS

| | | |
|---|---|---|
| EP | 2104375 A2 | 9/2009 |
| WO | 2008107732 A1 | 9/2008 |

OTHER PUBLICATIONS

Extended European Search Report dated Mar. 28, 2011. In corresponding application No. 10178685.3.
A3D joystick for mobile phones. www.articlesbase.com/videos/5min/196546858 describes a combination speaker / microphone element. Retrieved on Apr. 3, 2012.
How Stuff Works Inside a Digital Cell Phone. http://electronics.howstuffworks.com/cell-phone6.htm shows a cell phone with a speaker and a microphone. Retrieved Apr. 3, 2012.
Apple iPhone 4S—Buy the New iPhone. http://store.apple.com/us/browse/home/shop_iphone/family/iphone?afid=p219%7CGOUS&cid=OAS-US-KWG-iPhone shows a cell phone with a rotatable user interface. Retrieved on Apr. 3, 2012.

(Continued)

*Primary Examiner* — Diane Mizrahi
(74) *Attorney, Agent, or Firm* — Novak Druce + Quigg LLP

(57) ABSTRACT

A system and method for determining the orientation of a mobile device for displaying a graphical user interface and for activating an audio user interface in response to an incoming call or outgoing call. For the graphical user interface, depending on the detected orientation of the mobile device, the graphical user interface can be displayed in a first vertical orientation, a second vertical orientation, a first horizontal orientation, and a second horizontal orientation. For the audio user interface, depending on the detected orientation of the mobile device, a speaker and a microphone can be activated based on the detected vertical orientation so that the activated speaker is near the top of the mobile device and the activated microphone is near the bottom of mobile device.

14 Claims, 12 Drawing Sheets

OTHER PUBLICATIONS

Nokia N82 Review: Stereo Speaker Placement & The battery life. http://webcache.googleusercontent.com/search?q=cache:r1dklkDrjqMJ:www.symbian-addict.com/2008/03/nokia-n82-review-stereo-speaker. html&cd=1&hl=en&ct=clnk&gl=us. Retrieved on Apr. 16, 2010.

HTC Tilt 2 User Manual. http://member.america.htc.com/download/web_materials/Manual/HTC_Tilt_2(ATT)/090826a_Barium_ATT_UM.pdf. Retrieved on Apr. 4, 2012.

Touch Pro 2 User Manual. http://member.america.htc.com/download/web_materials/Manual/TC_Touch_Pro2/090707_Rhodium_HTC_WWE_UM.pdf. Retrieved on Apr. 4, 2012.

My Digital Life—Philips SBD7000 Rotating Speaker Dock for iPhone and Ipod. http://www.mydigitallife.info/2009/01/21/philips-sbd7000-rotating-speakerdock-for-iphone-and-ipod/. Published Jan. 21, 2009 and retrieved Apr. 3, 2012.

Leveraging Accelerometers in Mobile Devices. http://www.slideshare.net/scottjanousek/leveraging-accelerometers-in-mobiledevices. Retrieved Apr. 3, 2012.

Accelerometer—Mobile terms glossary-GSMArena.com. http://www.gsmarena.com/glossary.php3?term=accelerometer. Retrieved on Apr. 3, 2012.

The International Search Report and The Written Opinion of the International Searching Authority mailed on Oct. 25, 2011. In corresponding application No. PCT/US2011/052611.

Microphone_Wikipedia—http://en.wikipedia.org/wiki/Microphone. Retrieved on Apr. 4, 2012.

* cited by examiner

SYSTEM AND METHOD FOR ROTATING A USER INTERFACE FOR A MOBILE DEVICE

FIELD OF TECHNOLOGY

The present disclosure relates to mobile devices, and more specifically to rotating a user interface for a mobile device based on the orientation of the mobile device.

BACKGROUND

Mobile devices are becoming more prevalent and more advanced. Mobile devices can include, but are not limited to, cellular telephones, smart telephones, wireless personal digital assistants (PDAs), and laptop computers with wireless 802.11 or Bluetooth capabilities. These devices can run on a wide variety of networks from data-only networks such as Mobitex® and DataTAC® networks to complex voice and data networks such as GSM/GPRS, CDMA, EDGE, UMTS and CDMA2000 networks. As the technology associated with mobile devices continues to advance, users of these devices are becoming more reliant on these devices. Along with this reliance, there is an increase in the popularity of touch-sensitive displays or touchscreens based mobile devices due to the larger display screens. Typically, these touchscreen mobile devices are substantially rectangular having two shorter sides and two longer sides with the touchscreen between the four sides with a microphone on one of the shorter sides and a speaker on the opposite shorter side. In response to an incoming call or an outgoing call, call information can be displayed on the display screen. The call information can be displayed in a vertical orientation with the speaker near the top of the mobile device and the microphone near the bottom of the mobile device. Thus, when a user attempts to use a mobile device with a touchscreen to place a call or receive a call, the user must determine the proper orientation of the mobile device. For example, the user has to determine the proper vertical orientation of the mobile device with the speaker near the top and the microphone near the bottom. Typically, the user is able to determine the proper vertical orientation based on call information displayed by the user interface.

BRIEF DESCRIPTION OF THE DRAWINGS

Implementations of the present disclosure will now be described, by way of example only, with reference to the attached Figures, wherein.

DETAILED DESCRIPTION

Figure 1:
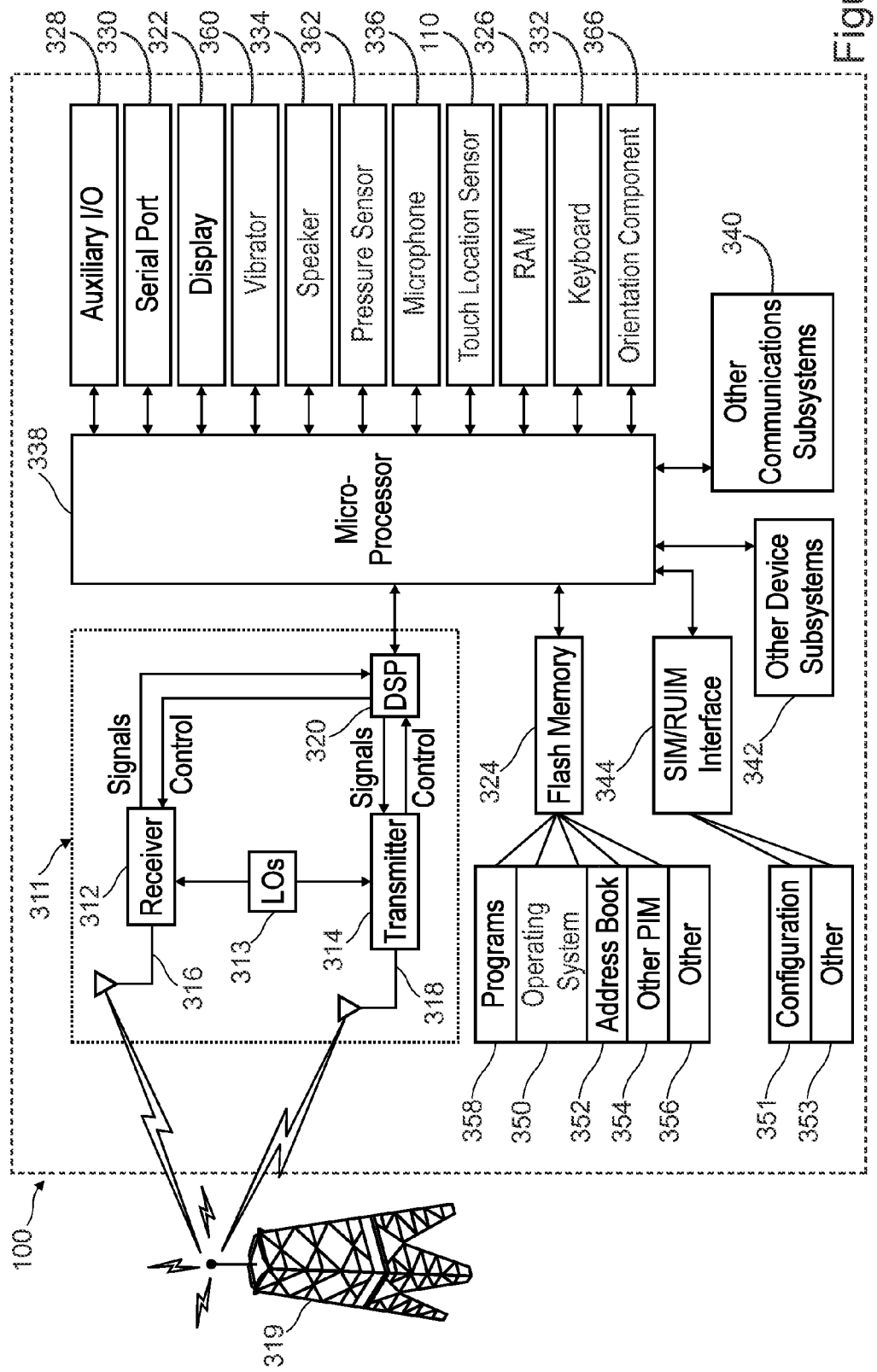
FIG. 1 is a block diagram of a mobile device in a communication network in accordance with an exemplary implementation.

As will be appreciated for simplicity and clarity of illustration, where appropriate, reference numerals have been repeated among the different figures to indicate corresponding or analogous elements. In addition, numerous specific details are set forth in order to provide a thorough understanding of the implementations described herein. However, those of ordinary skill in the art will understand that the implementations described herein can be practiced without these specific details. In other instances, methods, procedures and components have not been described in detail so as not to obscure the related relevant feature being described. Also, the description is not to be considered as limiting the scope of the implementations described herein.

Several definitions that apply throughout this disclosure will now be presented. The word "coupled" is defined as connected, whether directly or indirectly through intervening components, and is not necessarily limited to physical connections. The term "communicatively coupled" is defined as connected whether directly or indirectly though intervening components, is not necessarily limited to a physical connection, and allows for the transfer of data. The term "mobile device" is defined as any electronic device that is capable of at least accepting information entries from a user and includes the device's own power source. A "wireless communication" means communication that occurs without wires using electromagnetic radiation. The term "memory" refers to transitory memory and non-transitory memory. For example, non-transitory memory can be implemented as Random Access Memory (RAM), Read-Only Memory (ROM), flash, ferromagnetic, phase-change memory, and other non-transitory memory technologies. The term "media" is defined as visual, audio, or combined visual and audio data which can be outputted by a mobile device.

The present disclosure provides a system and method for determining the orientation of a mobile device 100 for displaying a graphical user interface and for activating an audio user interface in response to an incoming call or outgoing call. For the graphical user interface, depending on the detected orientation of the mobile device 100, the graphical user interface can be displayed in a first vertical orientation, a second vertical orientation, a first horizontal orientation, and a second horizontal orientation. For the audio user interface, depending on the detected orientation of the mobile device 100, a speaker and a microphone can be activated based on the detected vertical orientation so that the activated speaker is at a higher short side of the mobile device 100 and the activated microphone is at a lower short side of the mobile device 100.

Referring to FIG. 1, a block diagram of a mobile device in a communication network in accordance with an exemplary implementation is illustrated. As shown, the mobile device 100 can include a microprocessor 338 that controls the operation of the mobile device 100, such as facilitating communications, providing a graphical user interface, executing programs, and so forth. A communication subsystem 311 performs communication transmission and reception with the wireless network 319. The microprocessor 338 further can be coupled with an auxiliary input/output (I/O) subsystem 328 that can be coupled to the mobile device 100. Additionally, in at least one implementation, the microprocessor 338 can be coupled to a serial port (for example, a Universal Serial Bus port) 330 that facilitates communication with other devices or systems via the serial port 330. A display 322 can be communicatively coupled to the microprocessor 338 to facilitate display of information to an operator of the mobile device 100. When the mobile device 100 is equipped with a keyboard 332, which may be physical or virtual (e.g., displayed), the keyboard 332 can be communicatively coupled to the microprocessor 338. The mobile device 100 can include one or more speakers 334 and one or more microphones 336, which may advantageously be communicatively coupled to the microprocessor 338 and discussed in further detail below. Additionally, a vibrator 360, such as a vibrator motor, can be communicatively coupled to the microprocessor 338 to generate vibrations in the mobile device 100. Other similar components can be provided on or within the mobile device 100 and are optionally communicatively coupled to the microprocessor 338. Other communication subsystems 340 and other communication device subsystems 342 are generally indicated as communicatively coupled with the microprocessor 338. An example of a communication subsystem 340 is a short-range communication system such as a BLUETOOTH® communication module or a WI-FI® communication module (a communication module in compliance with IEEE 802.11b) and associated circuits and components. Additionally, the microprocessor 338 can perform operating system functions and executes programs or software applications on the mobile device 100. In some implementations, not all of the above components are included in the mobile device 100. The auxiliary I/O subsystem 328 can take the form of one or more different navigation tools (multi-directional or single-directional), external display devices such as keyboards, and other subsystems capable of providing input or receiving output from the mobile device 100.

The mobile device 100 can be equipped with components to enable operation of various programs, as shown in FIG. 1. As shown, the memory 324 can provide storage for the operating system 350, device programs 358, data, and so forth. The operating system 350 can be generally configured to manage other programs 358 that are also stored in memory 324 and executable on the processor 338. The operating system 350 can handle requests for services made by programs 358 through predefined program 358 interfaces. More specifically, the operating system 350 can typically determine the order in which multiple programs 358 are executed on the processor 338 and the execution time allotted for each program 358, manages the sharing of memory 324 among multiple programs 358, handles input and output to and from other device subsystems 342, and so forth. In addition, operators can interact directly with the operating system 350 through a user interface, typically including the keyboard 332 and display screen 322. The operating system 350, programs 358, data, and other information can be stored in memory 324, RAM 326, read-only memory (ROM), or another suitable storage element (not shown). An address book 352, personal information manager (PIM) 354, and other information 356 can also be stored.

The mobile device 100 can be enabled for two-way communication within voice, data, or voice and data communication systems. A Subscriber Identity Module (SIM) or Removable User Identity Module (RUIM) can be utilized to authorize communication with the communication network 319. A SIM/RUIM interface 344 within the mobile device 100 can interface a SIM/RUIM card to the microprocessor 338 and facilitates removal or insertion of a SIM/RUIM card (not shown). The SIM/RUIM card features memory and can hold key configurations 351, and other information 353 such as identification and subscriber related information. The mobile device 100 can be equipped with an antenna 318 for transmitting signals to the communication network 319 and another antenna 316 for receiving communication from the communication network 319. Alternatively, a single antenna (not shown) can be utilized to transmit and receive signals. A communication subsystem 311 can include a transmitter 314 and receiver 312, one or more antennae 316, 318, local oscillators (LOs) 313, and a processing module 320 such as a digital signal processor (DSP) 320.

Figure 2:
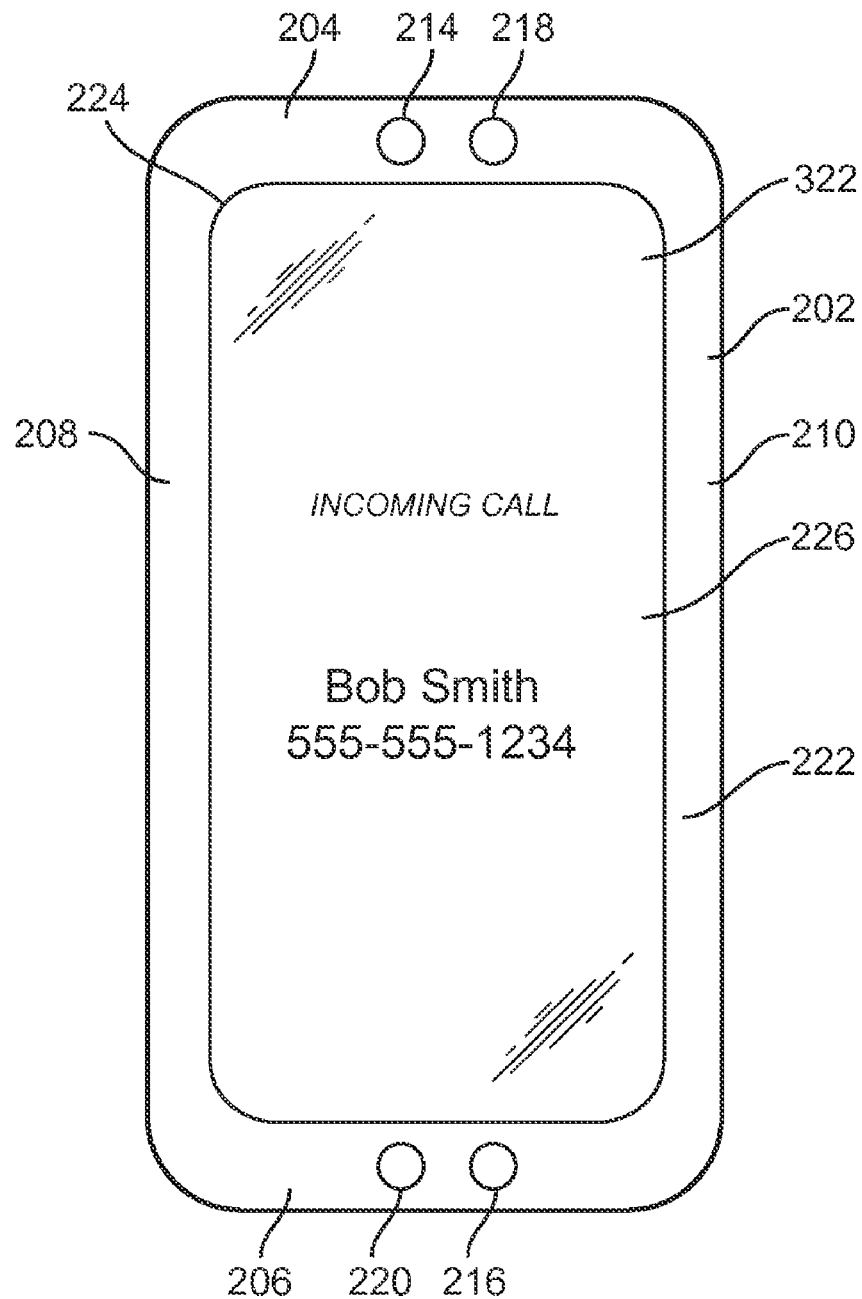
FIG. 2 is a front view of a mobile device in a first vertical orientation, with the mobile device having two microphones and two speakers in accordance with an exemplary implementation.

The mobile device 100 can include a touch-sensitive display or touchscreen 224 that includes one or more touch location sensors 364, an overlay 226, and a display 322, such as a liquid crystal display (LCD) or light emitting diode (LED) display, such as shown in FIG. 2. The touch location sensor(s) 364 can be a capacitive, resistive, infrared, surface acoustic wave (SAW), or other type of touch-sensitive sensor and can be integrated into the overlay 226. The overlay 226, or cover, can be comprised of laminated glass, plastic, or other suitable material(s) and is advantageously translucent or transparent. A touch, or touch contact, can be detected by the touchscreen 224 and processed by the processor 338, for example, to determine a location of the touch. Touch location data can include the center of the area of contact or the entire area of contact for further processing. A touch may be detected from a contact member, such as a body part of a user, for example a finger or thumb, or other objects, for example a stylus, pen, or other pointer, depending on the nature of the touch location sensor.

Referring to FIGS. 2-9, front views of a mobile device in vertical and horizontal orientations in accordance with exemplary implementations are illustrated. As shown, the mobile device 100 can include a substantially rectangular frame or body 202 having a first short side 204, a second short side 206, a first long side 208, and a second long side 210. The frame 202 can be a single structure or formed using multiple structures. The first short side 204 and second short side 206 can be on opposite sides of each other. The first long side 208 and second long side 210 can be on opposite sides of each other. A touchscreen 224 can be interposed between the first short side 204, the second short side 206, the first long side 208, and the second long side 210. The mobile device 100 can include audio components including at least one speaker and at least one microphone.

Referring to FIGS. 2-5, front views of a mobile device having two speakers and two microphones in vertical and horizontal orientations in accordance with exemplary implementations are illustrated. As shown, the mobile device 100 can include a first speaker 214, a second speaker 216, a first microphone 218, and a second microphone 220. The first speaker 214 and the second speaker 216 can be on opposite sides of each other and on the short sides of the mobile device 100. For example, the first speaker 214 can be on the first short side 204 and the second speaker 216 can be on the second short side 206. The first microphone 218 and the second microphone 220 can be on opposite sides of each other and on the short sides of the mobile device 100. For example, the first microphone 218 can be on the first short side 204 and the second microphone 220 can be on the second short side 206. In one or more implementations, a speaker and a microphone can be paired to form an audio pairing, with the speaker and microphone being on opposite sides of each other. For example, a first audio pairing can include the first speaker 214 on the first short side 204 and the second microphone 220 on the second short side 206 and a second audio pairing can include the second speaker 216 on the second short side 206 and the first microphone 218 on the first short side 204.

As shown in FIGS. 2-5, each audio component 214, 216, 218, 220 is shown on a top surface 222 of the mobile device 100. Although the audio component 214, 216, 218, 220 are shown on the top surface 222, one or more audio components 214, 216, 218, 220 can be on or about one or more of the top surfaces 222, side surface, bottom surface or any combination thereof. In one or more implementations, the mobile device can include more or less audio components. As discussed below, depending on the orientation of the mobile device 100, each audio component 214, 216, 218, 220 can be activated or deactivated.

Referring to FIGS. 6-9, front views of a mobile device, having two transducers, in vertical and horizontal orientations in accordance with exemplary implementations are illustrated. As shown, the mobile device can include a first transducer 402 at about the first short side 204 of the mobile device 100 and a second transducer 404 at about the second short side 206 of the mobile device 100. Although, the first transducer 402 and the second transducer 404 are shown as being on the top surface, the first transducer 402, the second transducer 404, or both can be on the top surface 222, side, or bottom surface of the mobile device 100. As discussed below, depending on the orientation of the mobile device 100, each transducer 402, 404 can function as a speaker or a microphone.

Figure 3:
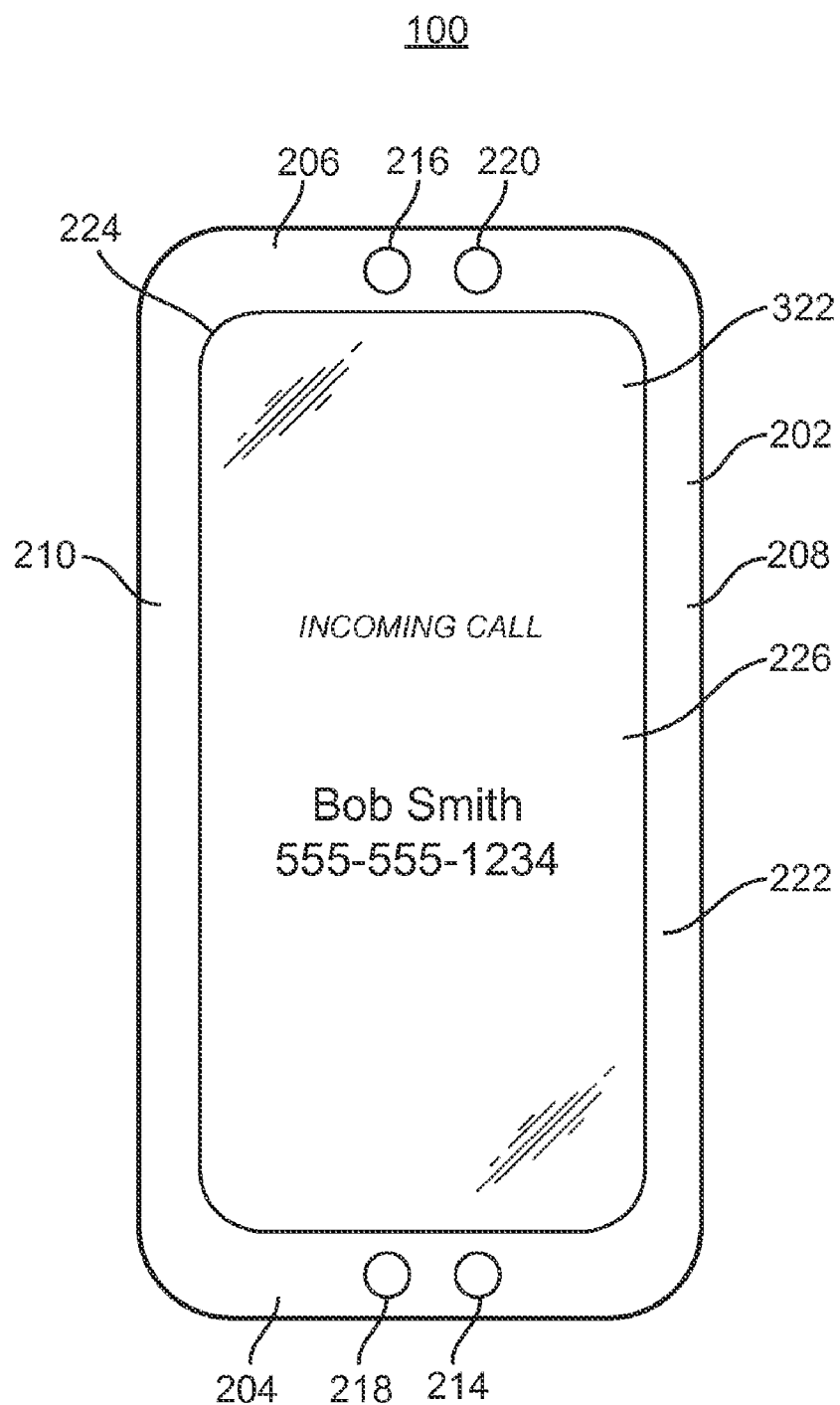
FIG. 3 is a front view of a mobile device in a first vertical orientation, with the mobile device having two microphones and two speakers in accordance with an exemplary implementation.
Figure 4:
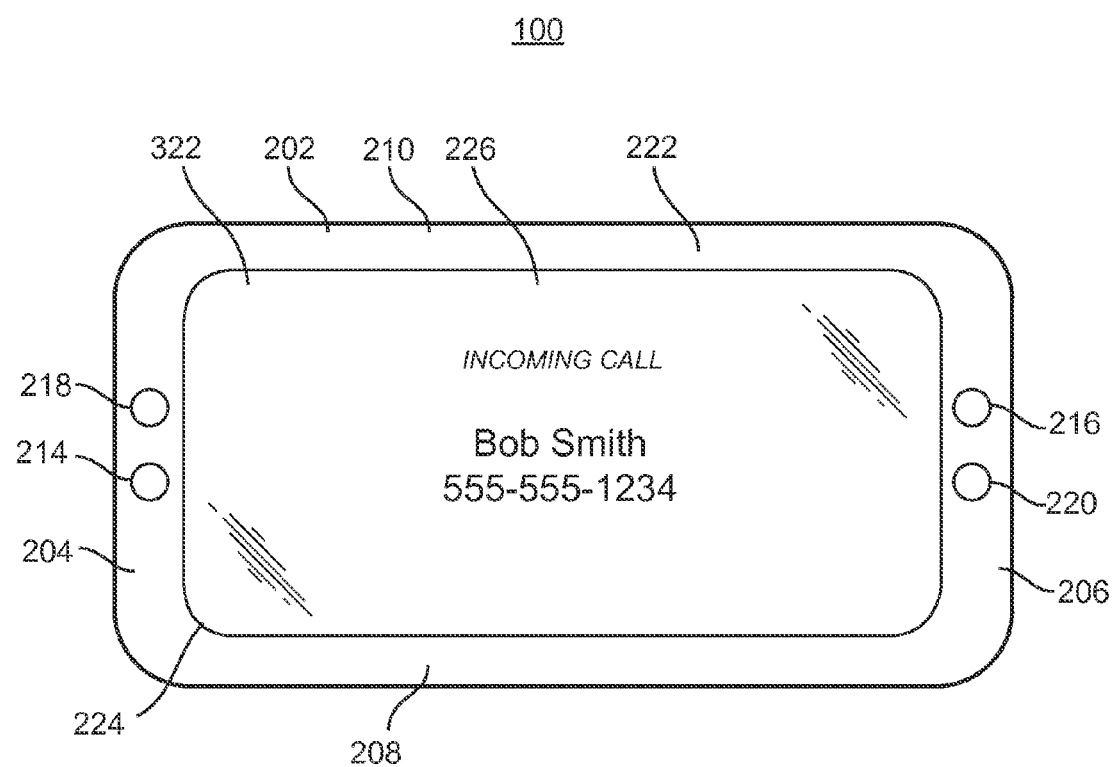
FIG. 4 is a front view of a mobile device in a first horizontal orientation, with the mobile device having two microphones and two speakers in accordance with an exemplary implementation.
Figure 5:
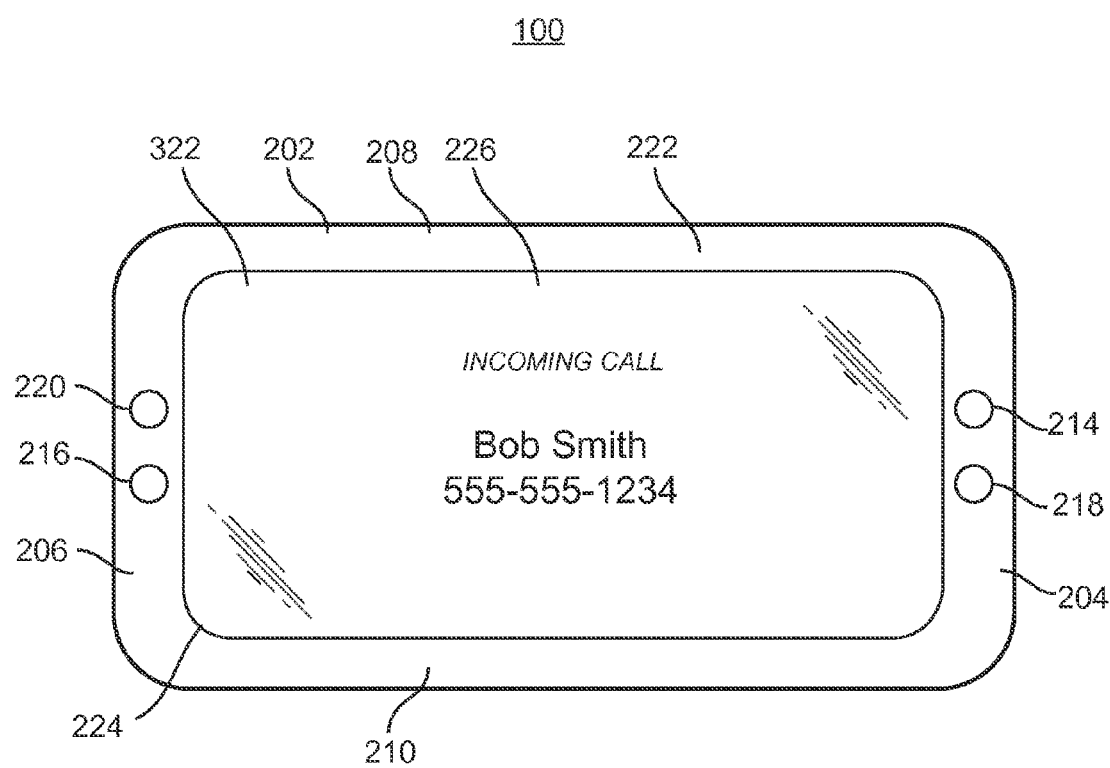
FIG. 5 is a front view of a mobile device in a first horizontal orientation, with the mobile device having two microphones and two speakers in accordance with an exemplary implementation.
Figure 6:
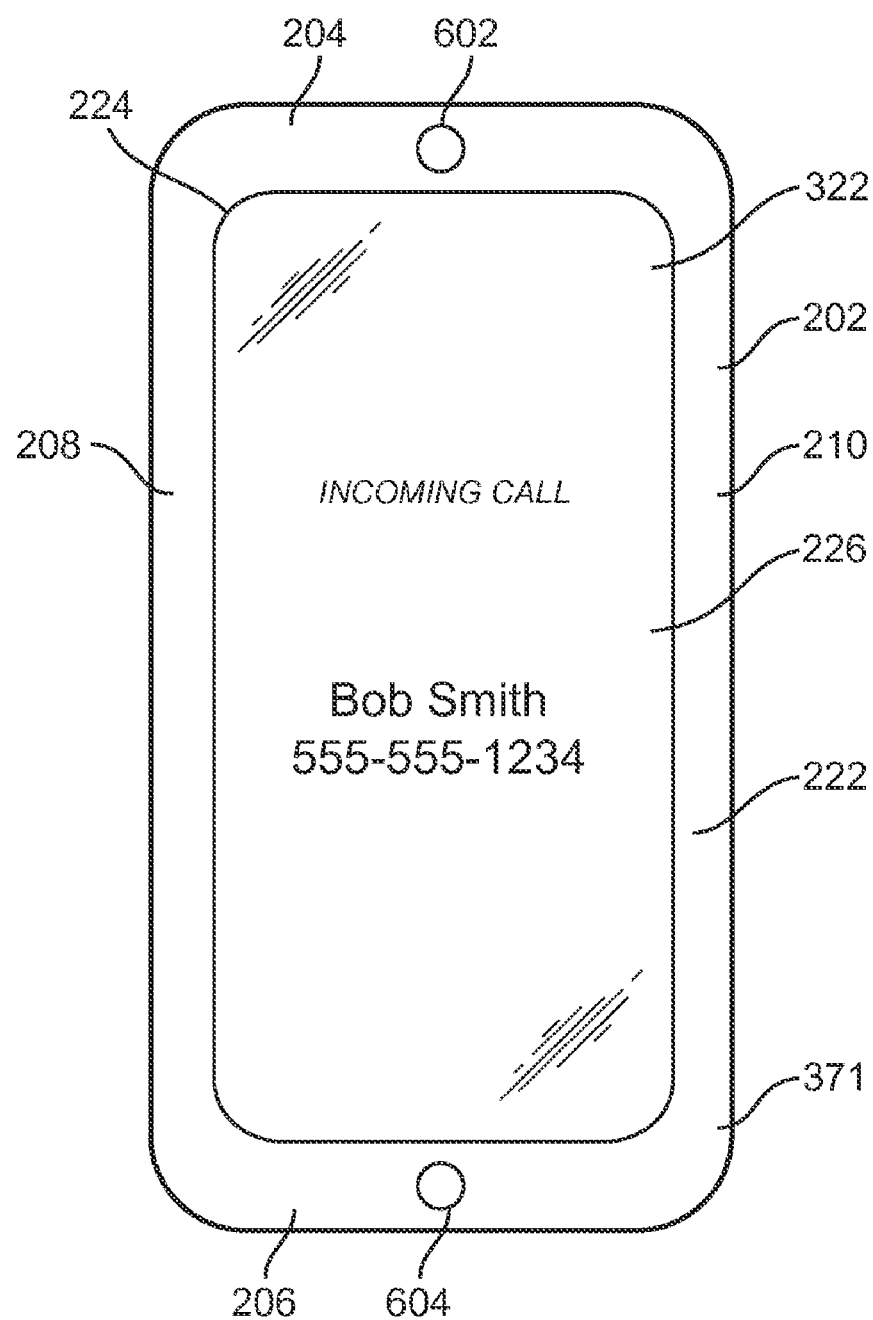
FIG. 6 is a front view of a mobile device in a first vertical orientation, with the mobile device having two transducers in accordance with an exemplary implementation.
Figure 7:
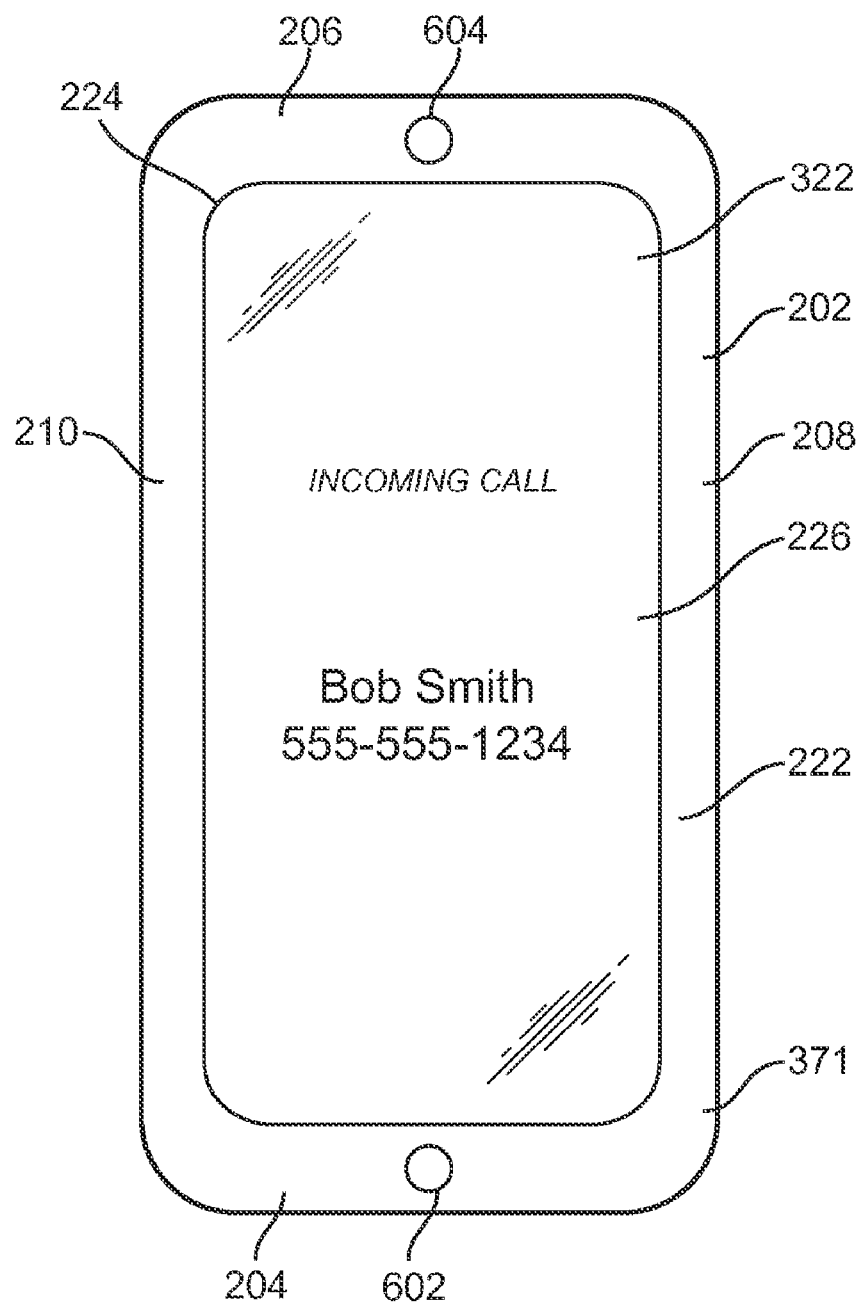
FIG. 7 is a front view of a mobile device in a second vertical orientation, with the mobile device having two transducers in accordance with an exemplary implementation.
Figure 8:
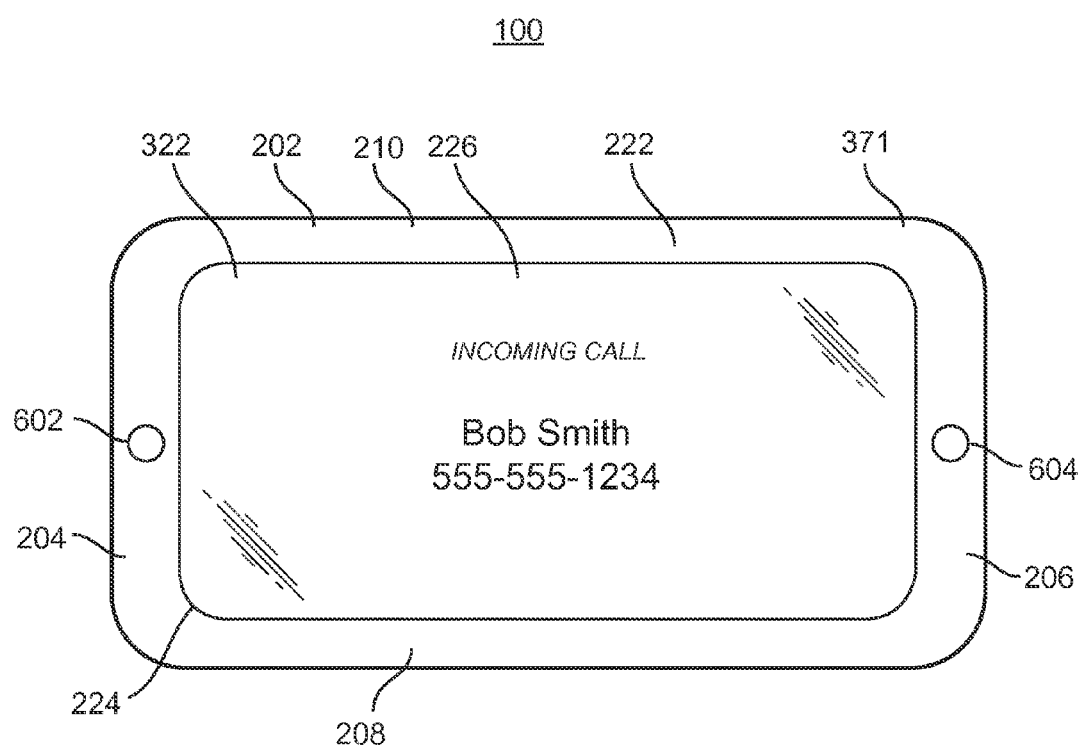
FIG. 8 is a front view of a mobile device in a first horizontal orientation, with the mobile device having two transducers in accordance with an exemplary implementation.
Figure 9:
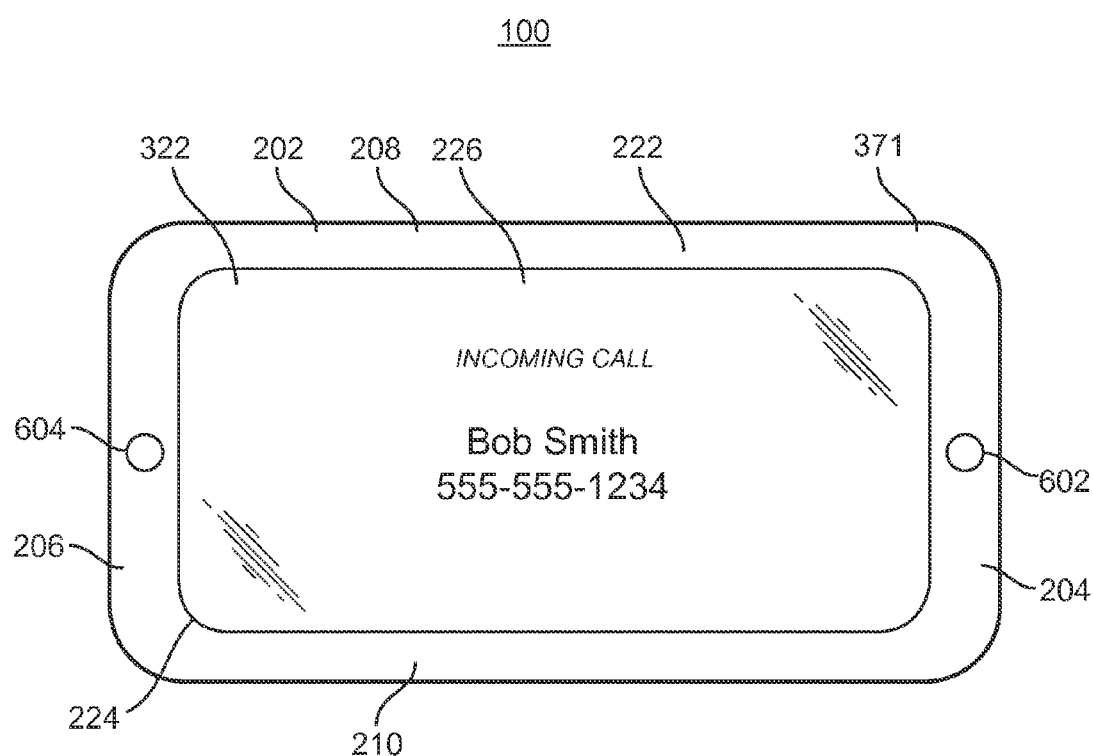
FIG. 9 is a front view of a mobile device in a second horizontal orientation, with the mobile device having two transducers in accordance with an exemplary implementation.

The mobile device 100 can include one or more orientation components 366 to detect the orientation of the mobile device 100. An orientation component 366 can detect which short side 204, 206 is higher than the other short side 204, 206. For example, the first short side 204 of the mobile device 1000 is higher or substantially higher than the second short side 206 as shown in FIGS. 2 and 6 and the second short side 206 of the mobile device 100 is higher or substantially higher than the first short side 204 as shown in FIGS. 3 and 7. Although the first vertical orientation and the second vertical orientation can be approximately 180° apart. In one or more implementations, the orientation component 366 can detect a horizontal orientation, a first horizontal orientation or a second horizontal orientation. In the horizontal orientation, the first short side 204 and the second short side 206 can be even with each other or substantially even with each other. For example, the mobile device 100 can be in a first horizontal orientation with the first short side 204 on the left and the second short side 206 on the right as shown in FIGS. 4 and 8 or can be in a second vertical orientation with the second short side 206 on the left and the first short side 204 on the right as shown in FIGS. 5 and 9. Although the vertical orientations are shown at 180° apart, each orientation can include a range, for example the range can be +/−180° for the audio user interface and for the vertical orientations and horizontal orientations the range can be +/−45° for the graphical user interface.

The orientation component can include one or more accelerometers, a gyroscopes, a mercury switches, any combination thereof, or any other device or devices that can detect which short side 204, 206 is higher than the other short side 204, 206, detect which side 204, 206, 208, 210 is higher than the sides 204, 206, 208, 210, or both. In one or more implementations, the mobile device 100 can include a manual switch (not shown) which can set the user interface in a single orientation. For example, a graphical user interface can be set to be displayed in a first vertical orientation, a second vertical orientation, a first horizontal orientation, or a second horizontal orientation. For the audio user interface, activation of a speaker 214, 216 and a microphone 218, 220 based on a first vertical orientation or a second vertical orientation.

By knowing the orientation of the mobile device 100, a graphical user interface can be displayed on the display 322 and an audio user interface can be activated by activating one or more speakers and one or more microphones in accordance with the determined vertical orientation of the mobile device 100. The graphical user interface can cause the display of information, such as an image or message, based on the determined orientation of the mobile device 100. For example, as shown in FIGS. 2-9, the information, "INCOMING CALL Bob Smith 555-555-1234," is displayed in accordance with the determined orientation. Thus, if the mobile device 100 of FIG. 2 is rotated 90° clockwise, then the information is rotated 90° clockwise and displayed as shown in FIG. 5. If the mobile device 100 of FIG. 5 is rotated 90° clockwise, then the information is rotated 90° clockwise and is displayed as shown in FIG. 3. If the mobile device 100 of FIG. 3 is rotated 90° clockwise, then the information is rotated 90° clockwise and is displayed as shown in FIG. 4. If the mobile device 100 of FIG. 4 is rotated 90° clockwise, then the information is rotated 90° clockwise and is displayed as shown in FIG. 2. Similarly, if the mobile device 100 of FIG. 6 is rotated 90° clockwise, then the information is rotated 90° clockwise and displayed as shown in FIG. 9. If the mobile device 100 of FIG. 9 is rotated 90° clockwise, then the information is rotated 90° clockwise and is displayed as shown in FIG. 7. If the mobile device 100 of FIG. 7 is rotated 90° clockwise, then the information is rotated 90° clockwise and is displayed as shown in FIG. 8. If the mobile device 100 of FIG. 8 is rotated 90° clockwise, then the information is rotated 90° clockwise and is displayed as shown in FIG. 6. As the mobile device 100 is rotated, the orientation component 366 can detect the orientation of the mobile device 100 and display the information in accordance with the orientation of the mobile device 100.

By knowing the orientation of the mobile device 100, an audio user interface can be enabled by activating one or more microphones and activating one or more speakers. For example, if the orientation component 366 determines that the mobile device 100 is in the first vertical orientation as shown in FIG. 2, then the first speaker 214 and the second microphone 220 can be activated. In addition, the second speaker 216 and first microphone 220 can remain deactivated. If the orientation component 366 determines that the mobile device 100 is in the second vertical orientation as shown in FIG. 3, then the second speaker 216 and first microphone 218 can be activated. In addition, the first speaker 214 and the second microphone 220 can remain deactivated. If mobile device 100 contains transducers, based on the orientation, one transducer can be configured to function as a speaker and the other transducer can be configured to function as a microphone. For example, in the event the orientation component 366 determines that the mobile device 100 is in a first vertical orientation as shown in FIG. 6, the first transducer 402 can be configured to function as a speaker and the second transducer 404 can be configured to function as a microphone. In another example, in the event the orientation component 366 determines that the mobile device 100 is in a second vertical orientation as shown in FIG. 7, the first transducer 402 can be configured to function as a microphone and the second transducer 404 can be configured to function as a speaker.

In the event the mobile device 100 is in a horizontal orientation as shown in FIG. 4, 5, 8, or 9, then once the orientation of the mobile device 100 is detected as being in a vertical orientation, then one or more of the audio components 214, 216, 218, 220 can be activated accordingly in response to an incoming call or outgoing call. For example, in the event the mobile device 100 of FIG. 4 is in the telephone mode and the mobile device 100 is rotated to the first vertical orientation as shown in FIG. 2, then the first speaker 214 and second microphone 220 can be activated. In addition, the second speaker 216 and first microphone 218 can remain deactivated. In another example, in the event the mobile 100 of FIG. 4 is in the telephone mode and the mobile device 100 is rotated to the second vertical orientation as shown in FIG. 3, then the second speaker 216 and first microphone 218 can be activated. In addition, the first speaker 214 and second microphone 220 can remain deactivated. In another example, in the event the mobile device 100 of FIG. 4 is rotated to the first vertical orientation as shown in FIG. 6, then the first transducer 602 can be configured to function as a speaker and the second transducer 604 can be configured to function as a microphone. In yet another example, in the event the mobile device 100 of FIG. 4 is rotated to the second vertical orientation as shown in FIG. 7, then the first transducer 602 can be configured to function as a microphone and the second transducer 604 can be configured to function as a speaker. Regardless of the determined orientation of the mobile device 100, in the event the mobile device is in a music playing mode, then one or more speakers can be activated. For example, both speakers 214, 216 shown in FIGS. 2-5 can be activated or both transducers 402, 404 shown in FIGS. 6-9 can be configured to function as speakers.

Figure 10:
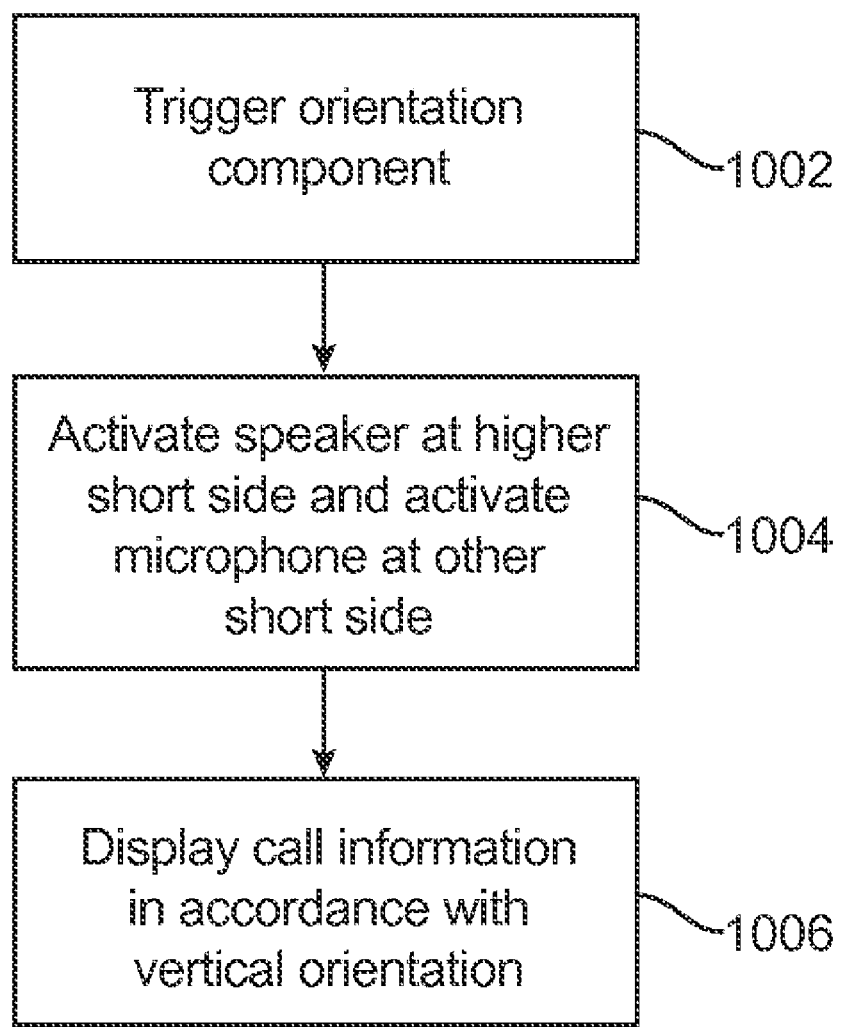
FIG. 10 is a flowchart of a first method for displaying a graphical user interface and activating an audio user interface in accordance with an exemplary implementation.

Referring to FIG. 10, a flowchart of a first method for displaying a graphical user interface and activating an audio user interface in accordance with an exemplary implementation is illustrated. This exemplary method 1000 can be used when the processor 336 is configured to only determine two orientations based on the information provided from the orientation component 366 which can be from an orientation signal. The two orientations can be when the first short side 204 is higher than the second short side 206 and the second short side 206 is higher than the first short side 206. In the event, the first short side 204 and the second short side 206 are exactly or substantially exactly even, the processor 336 can have a default mode such as the first short side 204 being higher than the second short side 206 and thus a user of the mobile device 100 can recognize the proper orientation based on the how the call information is displayed, for example with the call information shown with the orientated with the first short side 204 being higher than the second short side 206 as shown in FIGS. 2 and 5. In other implementations, one or more other defaults can be used such as the method shown in FIG. 12. The exemplary method 1000 is provided by way of example, as there are a variety of ways to carry out the method. The method 1000 described below can be carried out using the communication devices and communication network shown in FIGS. 1-9 by way of example, and various elements of these figures are referenced in explaining exemplary method 1000. Each block shown in FIG. 10 represents one or more processes, methods or subroutines carried out in exemplary method 1000. The exemplary method 1000 may begin at block 1002.

At block 1002, the orientation component is triggered. For example, in response to an incoming call or an outgoing call, the processor 336 can trigger the orientation component 366 to determine which short side 204, 206 is higher. After triggering the orientation component 366, the method 1000 can proceed to block 1004.

At block 1004, the speaker at the higher short side is activated and a microphone at the other short side is activated. The processor 336 can receive an orientation signal from the orientation component 366 with the orientation signal indicating whether the first short side 204 is higher than the second short side 206 as shown in FIGS. 2 and 6 or in the event the second short side 206 is higher than the first short side 204 as shown in FIGS. 3 and 7. For example, the processor 226 can activate the first speaker 214 and activate the second microphone 216 of FIG. 2. In another example, the first transducer 602 can be configured to function as a speaker and the second transducer 604 can be configured to function as a microphone. In addition, the non-activated audio components can remain non-activated. For example, in the event the first side 204 is higher than the second short side 206 as shown in FIG. 2, then the second speaker 216 and the second microphone 218 remain non-activated. After activating the speaker at the higher short side and the microphone at the other short side, the method 1000 proceeds to block 1006.

At block 1006, call information is displayed in accordance with the vertical orientation of the mobile device. The processor 338 can cause the display of the call information in accordance with the vertical orientation of the mobile device 100. For example, as shown in FIGS. 2 and 6, the processor 338 can cause the display of the call information, "INCOMING CALL Bob Smith 555-555-1234," in accordance with the vertical orientation of mobile device, for example, the first short side 204 being higher than the second short side 206. For example, as shown in FIGS. 3 and 7, the processor 338 can cause the display of the call information, "INCOMING CALL Bob Smith 555-555-1234," in accordance with the vertical orientation of mobile device, for example, the second short side 206 being higher than the first short side 204.

Figure 11:
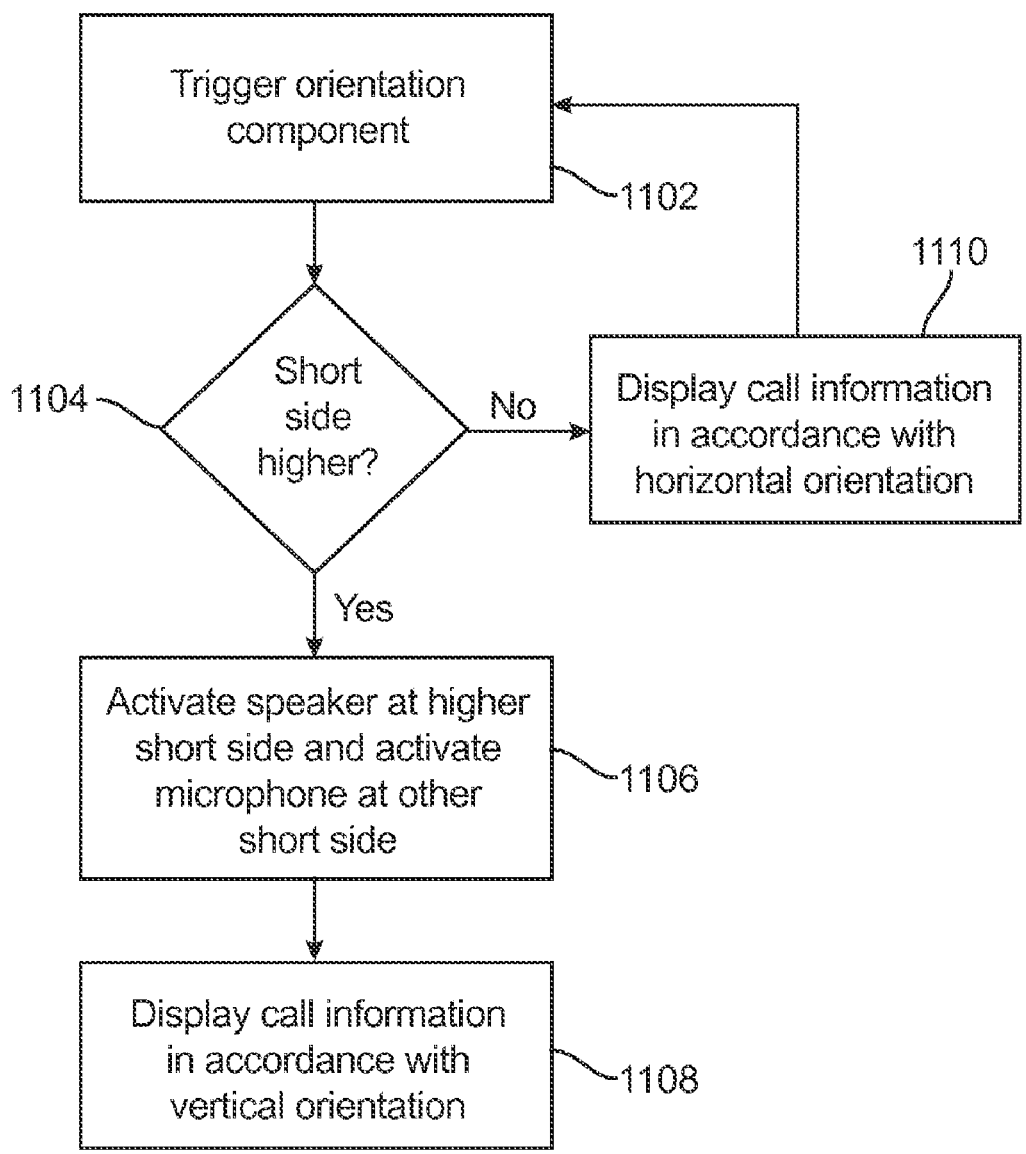
FIG. 11 is a flowchart of a second method for displaying a graphical user interface and activating an audio user interface in accordance with an exemplary implementation.

Referring to FIG. 11, a flowchart of a second method for displaying a graphical user interface and activating an audio user interface in accordance with an exemplary implementation is illustrated. This exemplary method 1100 can be used when the processor 336 is configured to determine four orientations based on the information provided from the orientation component 366 which can be from an orientation signal. The four orientations can be when the first short side 204 is higher than the rest of the sides 206, 208, 210, when the second short side 206 is higher than the rest of the sides 204, 208, 210, when the first long side 208 is higher than the rest of the sides 204, 206, 210, and when the second long side 210 is higher than the rest of the sides 202, 204, 208. In this exemplary method 1100, the call information can be displayed in accordance with the orientation and in the event the orientation is horizontal (one of the long sides 208, 210 is higher than the other sides 204, 206, 208, 210, then the activation of a speaker and microphone can be delayed while the user rotates the mobile device 100 into a vertical orientation (the first short side 204 being higher than the second short side 206 or the second short side 206 being higher than the first short side 204). The exemplary method 1100 is provided by way of example, as there are a variety of ways to carry out the method. The method 1100 described below can be carried out using the communication devices and communication network shown in FIGS. 1-9 by way of example, and various elements of these figures are referenced in explaining exemplary method 1100. Each block shown in FIG. 11 represents one or more processes, methods or subroutines carried out in exemplary method 1100. The exemplary method 1100 may begin at block 1102.

At block 1102, the orientation component is triggered. For example, in response to an incoming call or an outgoing call, the processor 336 can trigger the orientation component 366 to determine which short side 204, 206 is higher. In another example, the orientation component 366 can be triggered again after call information "INCOMING CALL Bob Smith 555-555-1234," is displayed in accordance with a horizontal orientation as shown in FIGS. 4, 5, 7, and 8. After triggering the orientation component 366, the method 1000 can proceed to block 1104.

At block 1104, a determination is made whether a short side is the higher side. For example, the processor 336 can receive the orientation signal from the orientation component 366 with the orientation signal indicating which side 204, 206, 208, 210 is higher than the other sides 204, 206, 208, 210. In the event one of the short sides 204, 206 is higher as shown in FIGS. 2, 3, 6, and 7, then the method 1100 can proceed to block 1106. In the event one of the long sides 208, 210 is higher as shown in FIGS. 4, 5, 8, and 9, then the method 1100 can proceed to block 1110.

At block 1106, the speaker at the higher short side is activated and a microphone at the other short side is activated. The processor 336 can receive an orientation signal from the orientation component 366 with the orientation signal indicating whether the first short side 204 is higher than the second short side 206 as shown in FIGS. 2 and 6 or in the event the second short side 206 is higher than the first short side 204 as shown in FIGS. 3 and 7. For example, the processor 226 can activate the first speaker 214 and activate the second microphone 216 of FIG. 2. In another example, the first transducer 602 can be configured to function as a speaker and the second transducer 604 can be configured to function as a microphone. In addition, the non-activated audio components can remain non-activated. For example, in the event the first side 204 is higher than the second short side 206 as shown in FIG. 2, then the second speaker 216 and the second microphone 218 remain non-activated. After activating the speaker at the higher short side and the microphone at the other short side, the method 1100 proceeds to block 1108.

At block 1108, call information is displayed in accordance with the vertical orientation of the mobile device. The processor 338 can cause the display of the call information in accordance with the vertical orientation of the mobile device 100. For example, as shown in FIGS. 2 and 6, the processor 338 can cause the display of the call information, "INCOMING CALL Bob Smith 555-555-1234," in accordance with the vertical orientation of mobile device, for example, the first side 204 being higher than the second side 206. For example, as shown in FIGS. 3 and 7, the processor 338 can cause the display of the call information, "INCOMING CALL Bob Smith 555-555-1234," in accordance with the vertical orientation of mobile device, for example, the second side 206 being higher than the first side 204. After displaying the call information, the method can proceed to block 1102.

At block 1110, call information is displayed in accordance with the horizontal orientation of the mobile device. The processor 338 can cause the display of the call information in accordance with the horizontal orientation of the mobile device 100. For example, as shown in FIGS. 5 and 9, the processor 338 can cause the display of the call information, "INCOMING CALL Bob Smith 555-555-1234," in accordance with the horizontal orientation of mobile device, for example, the first long side 208 being higher than the second long side 210. For example, as shown in FIGS. 4 and 8, the processor 338 can cause the display of the call information, "INCOMING CALL Bob Smith 555-555-1234," in accordance with the vertical orientation of mobile device, for example, the second long side 210 being higher than the first side 208.

Figure 12:
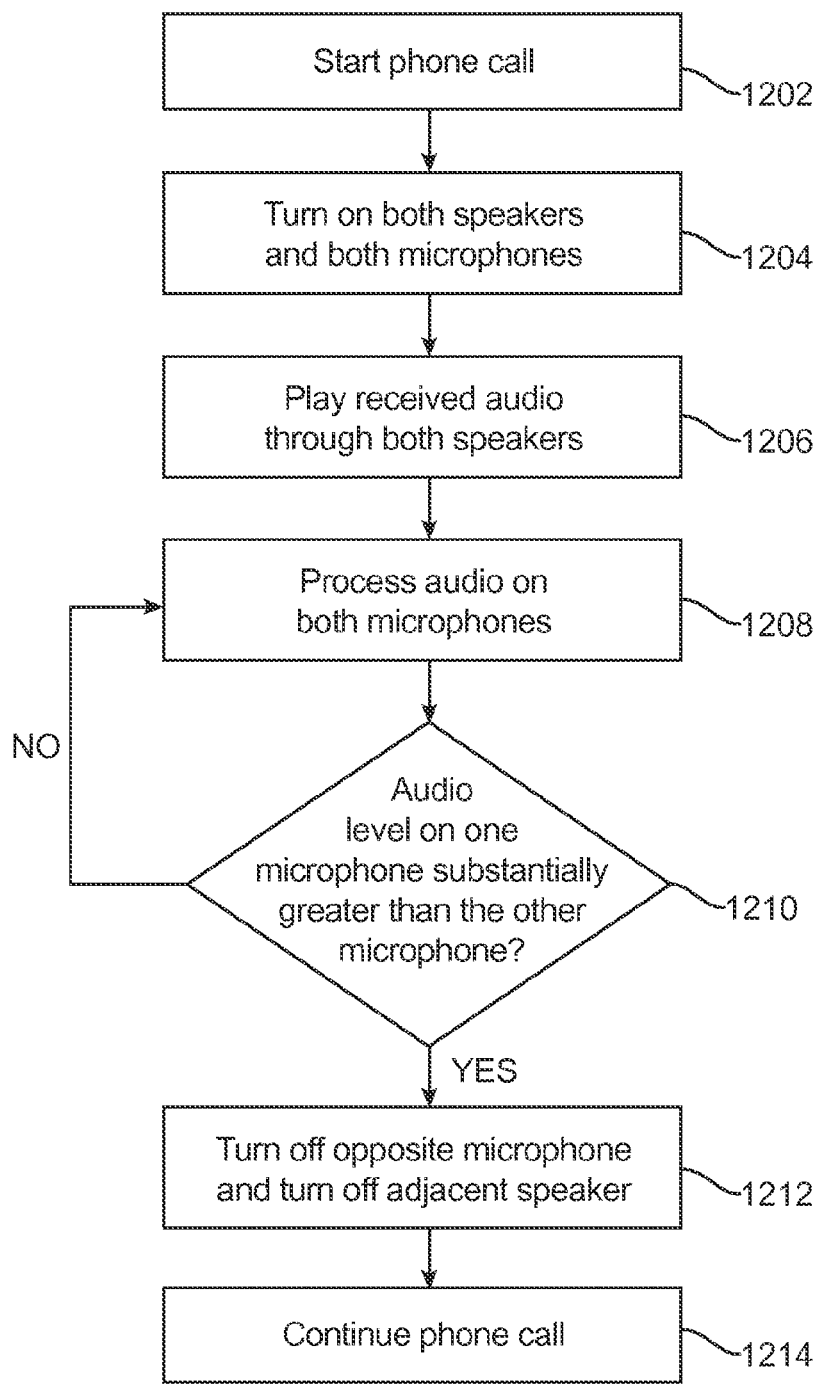
FIG. 12 is a flowchart of a method for activating an audio user interface in the event the orientation component does not provide a definitive orientation of the mobile device in accordance with an exemplary implementation.

Referring to FIG. 12, a flowchart of a method for activating an audio user interface in the event the orientation component does not provide a definitive orientation of the mobile device in accordance with an exemplary implementation is illustrated. This exemplary method 1200 can be used when the detected orientation is indeterminate, for example in the event the mobile device 100 is laying flat with no side 204, 206, 208, 210 being higher than the other sides 204, 206, 208, 210. In alternate implementations the process can eliminate the need for an accelerometer or other device that utilizes gravity to determine orientation. The exemplary method 1200 is provided by way of example, as there are a variety of ways to carry out the method. The method 1200 described below can be carried out using the communication devices and communication network shown in FIGS. 1-9 by way of example, and various elements of these figures are referenced in explaining exemplary method 1200. Each block shown in FIG. 12 represents one or more processes, methods or subroutines carried out in exemplary method 1200. The exemplary method 1200 may begin at block 1202.

At block 1202, a phone call is started. For example, the mobile device 100 can receive a phone call or can initiate a phone call. After starting a phone call is started, the method 1200 can proceed to block 1204.

At block 1204, both speakers and both microphones are turned on or activated. For example, the processor 338 can activate the first speaker 214, the second speaker 216, the first microphone 218, and the second microphone 220 are activated. After activating the first speaker 214, the second speaker 216, the first microphone 218, and the second microphone 220, the method 1200 can proceed to block 1206. In the event, the mobile device 100 has a first transducer 602 and a second transducer 604, then the processor 338 can configure both transducers 602, 604 to function as microphones. After activating both speakers 214, 216 and both microphones 218, 220, the method can proceed to block 1206. In the event, both transducers 602, 604 are configured to function as microphones, the method 1200 can proceed to block 1208 (not shown).

At block 1206, the received audio is played through both speakers. For example, in the event audio from another communication device, such as a mobile phone or landline telephone, is received by the mobile device 100, the processor 338 can play the audio via the first speaker 214 and the second speaker 216. After playing the received audio, the method 1200 can proceed to block 1208.

At block 1208, audio is processed or received on both microphones. For example, in the event audio is received at the first microphone 218, the second microphone 220 or both, the processor 338 can receive the audio and processes the received audio. Processing the received audio can include the processor 338 determining the signal to noise ratio (SNR) for each microphone 218, 220. After processing the audio, the method 1200 can proceed to block 1210.

At block 1210, a determination is made as to whether the audio level at one microphone is substantially greater than the audio level at the other microphone, this inequality would correspond to the user speaking with one microphone located closer to the mouth of the user than the other microphone. For example, the processor 338 can determine if the audio, for example, the SNR, is substantially greater at the first microphone 218 or the second microphone 220. The processor 338 can compare the SNR associated with the first microphone 218 with the SNR associated with the second microphone 220 to determine if one is substantially greater than the other. In the event, one SNR is not substantially greater, for example, the two SNRs are within a predetermine range, then the method 1200 can proceed to block 1208. In the event that one SNR is substantially greater, for example, one SNR is above a predetermined range higher than the other SNR, the method 1200 can proceed to block 1212. In alternate implementations, audio level determining approaches other than SNR are anticipated. Such approaches include signal to interference or total signal level. Furthermore, the audio level determination may be enhanced by performing the determination by either subtracting a signal substantially equivalent to the audio produced by the speakers and received by the microphones from the audio signal received by the microphones, or by performing the determination during relative quiet portions of audio produced by the speakers, or by using a combination thereof.

At block 1212, the microphone at the other side is turned off and the adjacent speaker is turned off. For example, based on the SNR, the processor 338 can turn off the microphone 218, 220 with the lower SNR and can turn off the speaker 214, 216 adjacent to the microphone 218, 220 that is not turned off. For example, in the event the processor 338 determines that the mobile device 100 is in the first vertical orientation as shown in FIG. 2, the processor 338 can turn off the first microphone 218 and can turn off the second speaker 216 and in the event the processor 338 determines that the mobile device 100 is in the second vertical orientation as shown in FIG. 3, the processor 338 turns off the second microphone 220 and turns off the first speaker 214. In the event, the mobile device 100 has a first transducer 602 and a second transducer 604, then the processor 338 can configure the transducers 602, 604 to function based on the orientation, for example, the first vertical orientation as shown in FIG. 6 or the second vertical orientation as shown in FIG. 7. In the event the processor 338 determines the mobile device 100 is in the first vertical orientation, then the first transducer 602 can be configured to function as a speaker and the second transducer can be configured to function as a microphone. Conversely, in the event the processor 338 determines the mobile device 100 is in the second vertical orientation, then the first transducer 602 can be configured to function as a microphone and the second transducer can be configured to function as a speaker. After turning off the appropriate components, the method 1200 can proceed to block 1214.

At block 1214, the phone call is continued.

The above reference was made in detail to implementations of the technology. Each example was provided by way of explanation of the technology only, not as a limitation of the technology. It will be apparent to those skilled in the art that various modifications and variations can be made in the present technology without departing from the scope or spirit of the technology. For instance, features described as part of one implementation can be used on another implementation to yield a still further implementation. Thus, it is intended that the present technology cover such modifications and variations that come within the scope of the technology.

The invention claimed is:

1. A mobile device having first and second opposing sides, the mobile device comprising:
a first speaker positioned at about the first side;
a second speaker positioned at about the second side;
a first microphone positioned at about the first side;
a second microphone positioned at about the second side;
an orientation component configured to determine an orientation of the mobile device, the orientation component including an accelerometer for determining a first orientation corresponding to the first side being oriented higher than the second side; and
a processor configured to activate either said first speaker and said second microphone or said second speaker and said first microphone in response to the orientation of the mobile device, the processor activating said first speaker and said second microphone in response to the first orientation determination.

2. The mobile device of claim 1 wherein the processor is further configured to maintain the deactivation of the second speaker and the first microphone in the event the orientation component detects the first side is higher than the second side.

3. The mobile device of claim 1 wherein the processor is further configured to maintain the deactivation of the first speaker and the second microphone in the event the orientation component detects the second side is higher than the first side.

4. The mobile device of claim 1 wherein the orientation component is one of a gyroscope and a mercury switch.

5. The mobile device of claim 1 further comprising third and fourth opposing sides, the orientation component being further configured to detect which one of the third and fourth opposing sides is higher than the other sides and the processor being configured to display call information in accordance with the detection of the higher side.

6. A mobile device having first and second opposing sides, the mobile device comprising:
a first speaker positioned at about the first side;
a second speaker positioned at about the second side;
a first microphone positioned at about the first side;
a second microphone positioned at about the second side;
an orientation component configured to determine an orientation of the mobile device; and
a processor configured to activate either said first speaker and said second microphone or said second speaker and said first microphone in response to the orientation of the mobile device,
said orientation component determines the orientation of the mobile device by causing said processor to activate both said first and second microphones, said orientation device further processes audio signals from both said first and second microphones and determines a first orientation of the mobile device in response to the second microphone receiving an audio signal greater than the first microphone, and said processor activates the first speaker and second microphone and deactivates the first microphone in response to the first orientation determination.

7. The mobile device according to claim 6 wherein said orientation component further causes said processor to activate both first and second speakers while determining the orientation of the mobile device, and said processor further deactivates the second speaker in response to the first orientation determination.

8. A mobile device having first and second opposing sides, the mobile device comprising:
a first speaker positioned at about the first side;
a second speaker positioned at about the second side;
a first microphone positioned at about the first side;
a second microphone positioned at about the second side;
an orientation component configured to determine an orientation of the mobile device; and a processor configured to activate either said first speaker and said second microphone or said second speaker and said first microphone in response to the orientation of the mobile device, the first speaker and the first microphone being a first transducer and the second speaker and the second microphone being a second transducer, in the event the orientation component detects that the first side is higher than the second side, the processor activates the first transducer to function as a speaker and causes the second transducer to function as a microphone.

9. A mobile device having first and second opposing sides, the mobile device comprising:
   a first speaker positioned at about the first side;
   a second speaker positioned at about the second side;
   a first microphone positioned at about the first side;
   a second microphone positioned at about the second side;
   an orientation component configured to determine an orientation of the mobile device; and
   a processor configured to activate either said first speaker and said second microphone or said second speaker and said first microphone in response to the orientation of the mobile device, the first speaker and the first microphone being a first transducer and the second speaker and the second microphone being a second transducer, in the event the orientation component detects that the second side is higher than the first side, the microprocessor activates the second transducer to function as a speaker and causes the first transducer to function as a microphone.

10. A computer program product for a mobile device having first and second opposing sides, the computer program product comprising:
    at least one computer readable medium; and
    at least one program module, stored on the at least one medium, and operative, upon execution by at least one processor for:
       receiving an orientation signal from an orientation component, wherein the orientation signal indicates the orientation of the mobile device; and
       activating either a first speaker and a second microphone or a second speaker and first microphone in response to the orientation of the mobile device, activating said first speaker further comprising maintaining the deactivation of said second speaker and activating said second microphone further comprises maintaining the deactivation of said first microphone.

11. The computer program product of claim 10 wherein the first speaker and the first microphone is a first transducer and the second speaker and the second microphone is a second transducer wherein in the event the orientation component detects the second side is higher than the first side, the microprocessor activates the second transducer to function as a speaker and activates the first transducer to function as a microphone.

12. The computer program product of claim 10 wherein the orientation component is an accelerometer.

13. The computer program product of claim 10 wherein the orientation component is one of a gyroscope and a mercury switch.

14. A computer program product for a mobile device with first and second opposing sides, the computer program product comprising:
    at least one computer readable medium; and
    at least one program module, stored on the at least one medium, and operative, upon execution by at least one processor for:
       receiving an orientation signal from an orientation component, wherein the orientation signal indicates the orientation of the mobile device; and
    activating either a first speaker and a second microphone or a second speaker and first microphone in response to the orientation of the mobile device, activating said second speaker further comprises maintaining the deactivation of said first speaker positioned and wherein activating said first microphone further comprises maintaining the deactivation of said second microphone.

* * * * *